(12) United States Patent
Latham

(10) Patent No.: US 9,293,897 B2
(45) Date of Patent: Mar. 22, 2016

(54) PANELBOARD AND ELECTRICAL POWER DISTRIBUTION SYSTEM

(71) Applicant: Dean Latham, Tullahoma, TN (US)

(72) Inventor: Dean Latham, Tullahoma, TN (US)

( * ) Notice: Subject to any disclaimer, the term of this patent is extended or adjusted under 35 U.S.C. 154(b) by 227 days.

(21) Appl. No.: 13/973,623

(22) Filed: Aug. 22, 2013

(65) Prior Publication Data

US 2014/0063694 A1    Mar. 6, 2014

Related U.S. Application Data

(60) Provisional application No. 61/693,985, filed on Aug. 28, 2012.

(51) Int. Cl.
*H02B 1/32* (2006.01)
*H02B 1/04* (2006.01)
*H02B 1/056* (2006.01)
*H02B 1/20* (2006.01)

(52) U.S. Cl.
CPC .................. *H02B 1/04* (2013.01); *H02B 1/056* (2013.01); *H02B 1/205* (2013.01); *H02B 1/32* (2013.01)

(58) Field of Classification Search
CPC ....................................................... H02B 1/056
USPC ........................................... 361/627, 636, 640
See application file for complete search history.

(56) References Cited

U.S. PATENT DOCUMENTS

| | | | | |
|---|---|---|---|---|
| 2,871,284 A | * | 1/1959 | Wills | 174/535 |
| 3,141,997 A | * | 7/1964 | Jacobs | 361/636 |
| 3,155,445 A | * | 11/1964 | Johnson | 439/376 |
| 5,046,173 A | * | 9/1991 | Wall, Jr. | 361/634 |
| 5,272,592 A | * | 12/1993 | Harris et al. | 361/637 |
| 6,002,580 A | * | 12/1999 | LeVantine et al. | 361/634 |
| 6,999,854 B2 | * | 2/2006 | Roth | 700/282 |
| 7,889,480 B2 | * | 2/2011 | Latham | 361/634 |
| 8,649,160 B2 | * | 2/2014 | Mills et al. | 361/636 |

* cited by examiner

*Primary Examiner* — Gregory Thompson
(74) *Attorney, Agent, or Firm* — Wayne Edward Ramage; Baker Donelson

(57) ABSTRACT

An electrical power distribution system or panelboard that includes a hollow central body with at least one insulated bus bar and a top non-energized metal mounting surface. A plurality of connection points are distributed along the bus bar for electrical device connections. The connection points are contained inside molded plastic holes or wells, and are electrically connected to the main bus bar. Electrical device connections are accomplished via connectors plugged into the holes or wells. The attachment of electrical devices of various sizes and configurations may be accommodated through the use of spacers.

21 Claims, 4 Drawing Sheets

PANELBOARD AND ELECTRICAL POWER DISTRIBUTION SYSTEM

This application claims benefit of and priority to U.S. Provisional Application No. 61/693,985, filed Aug. 28, 2012, by Dean Latham, and is entitled to that filing date for priority. The specification, figures and complete disclosure of U.S. Provisional Application No. 61/693,985 are incorporated herein by specific reference for all purposes.

FIELD OF INVENTION

This invention relates to an electrical power distribution system. More specifically, this invention relates to low voltage panelboards and power distribution systems with improved safety, ease of manufacture, and universal component compatibility.

BACKGROUND OF THE INVENTION

Panelboards (also known as loadcenters) and power distribution systems are currently used in many industrial and commercial applications as a means of distributing electrical power from an electrical source to a multitude of downstream loads (e.g., lighting, outlets, electrical equipment, and the like). These panelboards and power distribution systems provide a plurality of connection points for electrical components (e.g., circuit breakers) to electrically couple with an electrical source. Typically, that source is a two or three phase power supply. As is known in the art, the electrical components are designed to monitor and open the circuit to downstream loads when a predetermined load is exceeded.

Though the prior art panelboards and power distribution systems are effective in distributing power, many limitations exist. Due to their design, the prior art systems have "live" electrical connection points that are exposed. These live components pose a risk of shock during installation and maintenance. This is particularly the case when an electrical component is applied to a system, as these components are applied directly by personnel "screwing" or "plugging" in conductor parts, which may or may not be "live." An example of a panelboard with filling material is disclosed in Latham, U.S. Pat. No. 7,889,480 B2, which is incorporated herein by specific reference in its entirety for all purposes.

There is also an issue related to the manufacture of prior art panelboards and power distribution systems. Conducting parts on prior art systems are not insulated in an effort to facilitate assembly during manufacturing. Non-insulated parts pose a risk for personnel installing or performing maintenance on systems.

Additionally, there is an issue with the architecture of prior art panelboards and power distribution systems as it relates to electrical component (e.g. circuit breaker) compatibility. Prior art panelboards and power distribution systems are designed to accept only one type of component and are not designed to allow all market available products to be installed. Prior art panelboards and power distribution systems are not designed with an "open architecture."

Accordingly, what is needed is a panelboard and power distribution system that overcomes the problems discussed above.

SUMMARY OF THE INVENTION

In various exemplary embodiments, the present invention comprises a panelboard and power distribution system adapted to mount and electrically connect to a plurality of electrical components. The panelboard and power distribution system includes a central body portion having a top metal surface and at least one bus bar positioned within the central body portion. The bus bar has "tabs" that extend into an insulating body. The insulated connections form isolated connection "wells." The connection wells allow electrical devices to be connected to the power bus via insulated "plug in" clamp connectors. The panelboard and power distribution system uses an isolated clamp design located inside the connection wells for electrical device connection that insulates and isolates personnel during installation and operation. The insulated "plug in" clamp connectors are secured with an un-energized "snap" connection.

In another embodiment, the panelboard and power distribution system comprises a central bus bar and support structure that is fully insulated and isolated. The insulated bus bar further isolates potentially live electrical parts. Insulating the main electrical bus reduces the need for additive insulating parts which allows for economical product assembly.

In yet another embodiment, the panelboard and power distribution system uses a connection "system" that allows unlimited electrical component compatibility. The connection system consists of an "open architecture" mounting structure and insulated "plug in" clamp connectors that are plugged directly into the main system bus bar and secured with non-energized "snap" connections. The connectors are designed to be universally compatible with all known electrical devices that are suitable for use.

BRIEF DESCRIPTION OF THE DRAWINGS

FIG. 3 also shows peripheral bus with insulators removed and "plug in" connectors connected to the peripheral bus.

DETAILED DESCRIPTION OF EXEMPLARY EMBODIMENTS

Figure 1:
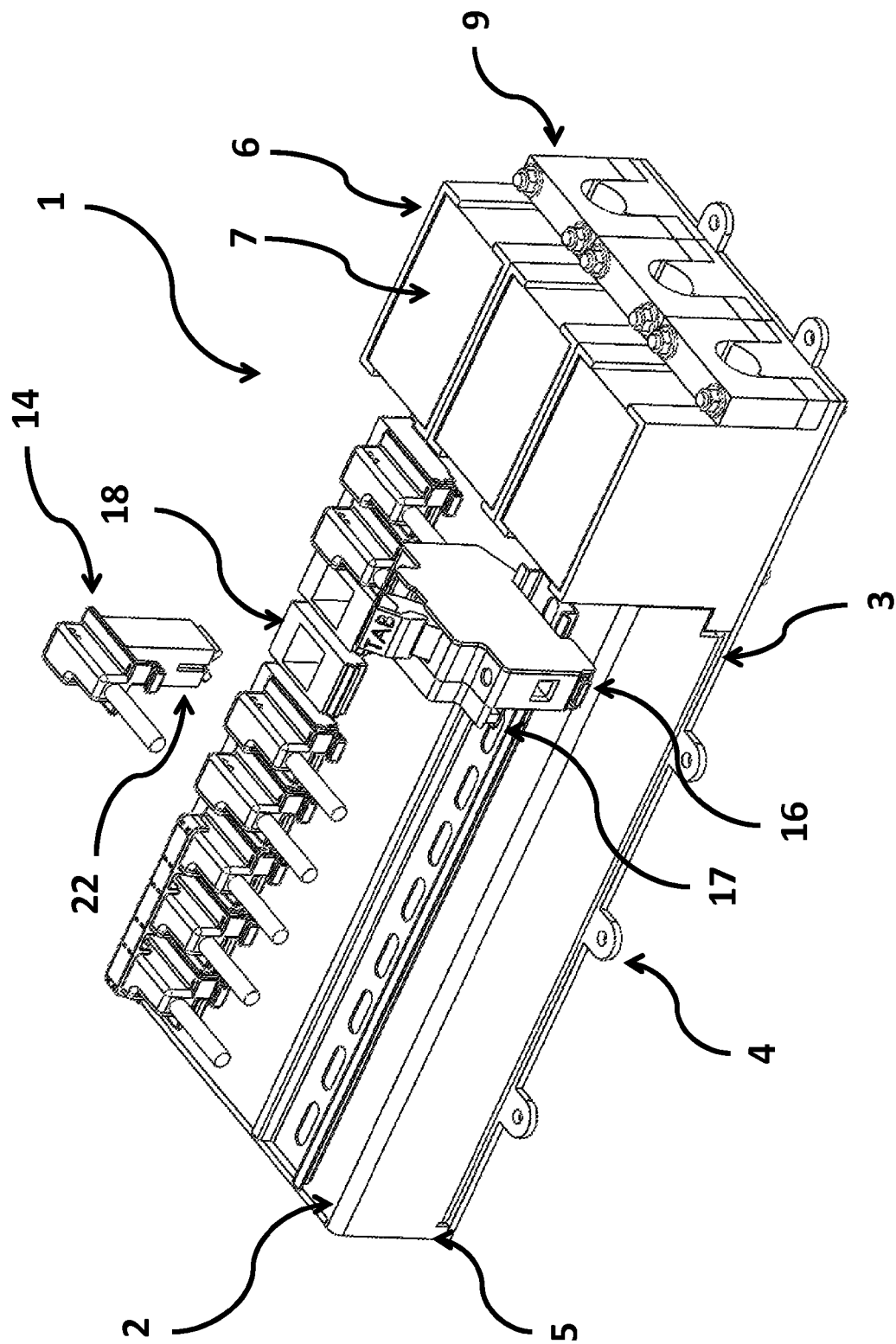
FIG. 1 shows a perspective view of a panelboard in accordance with an exemplary embodiment of the present invention.
Figure 2:
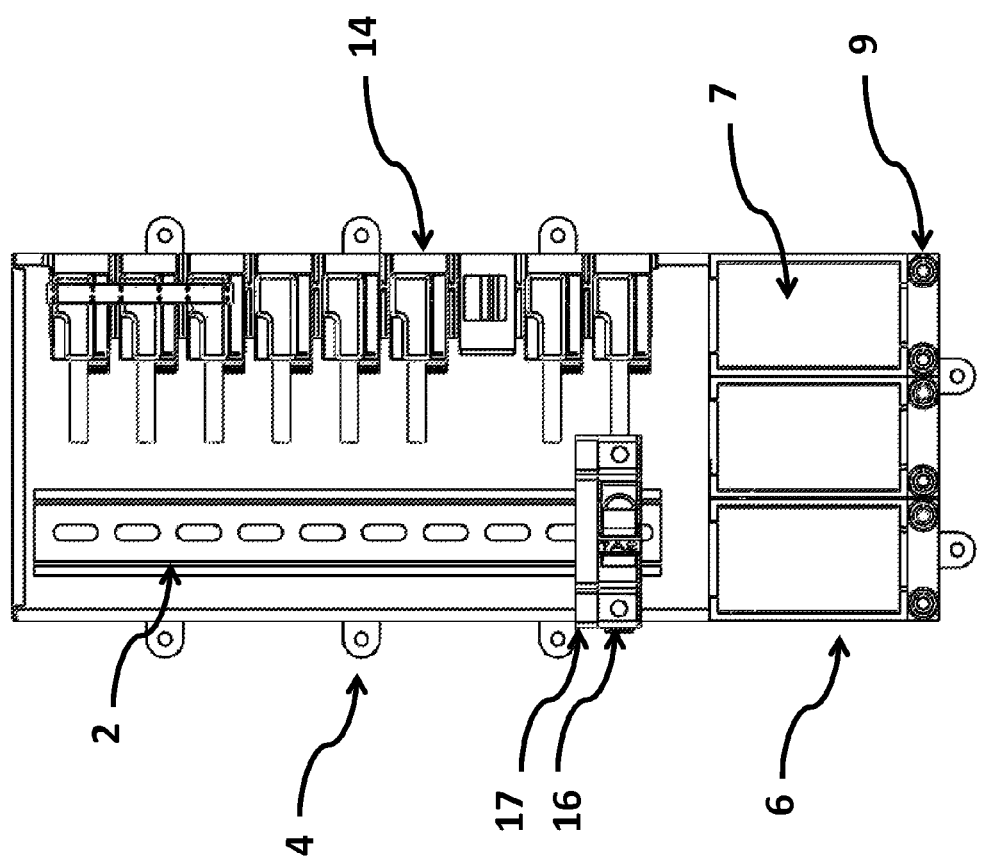
FIG. 2 shows a top view of the panelboard of FIG. 1.

In various exemplary embodiments, the present invention comprises a panelboard and power distribution system adapted to mount and electrically connect to a plurality of electrical components. The panelboard and power distribution system includes a central body portion having a top metal surface and at least one bus bar positioned within the central body portion. The bus bar has "tabs" that extend into an insulating body. The insulated connections form isolated connection "wells." The connection wells allow electrical devices to be connected to the power bus via insulated "plug in" clamp connectors. The panelboard and power distribution system uses an isolated clamp design located inside the connection wells for electrical device connection that insulates and isolates personnel during installation and operation. The insulated "plug in" clamp connectors are secured with an un-energized "snap" connection.

In another embodiment, the panelboard and power distribution system comprises a central bus bar and support structure that is fully insulated and isolated. The insulated bus bar further isolates potentially live electrical parts. Insulating the main electrical bus reduces the need for additive insulating parts which allows for economical product assembly.

In yet another embodiment, the panelboard and power distribution system uses a connection "system" that allows unlimited electrical component compatibility. The connection system consists of an "open architecture" mounting structure and insulated "plug in" clamp connectors that are plugged directly into the main system bus bar and secured with non-energized "snap" connections. The connectors are designed to be universally compatible with all known electrical devices that are suitable for use.

FIGS. 1 through 4B show one exemplary embodiment of the present invention. The panelboard 1 comprises a system top support 2 and a system bottom support 3. The system bottom support comprises a metal plate that runs under the entire system, while the system top support comprises a metal plate that runs over some or all of the system, both providing for support, stability and mounting of all components. Mounting feet 4 on the system bottom support 3 may be used for secure the panelboard/power bus distribution system to other structures. A plurality of securing points 5 may be used to secure the system bottom support and system top support together with thereby making a stable and insulated power distribution system "sandwich."

Figure 3:
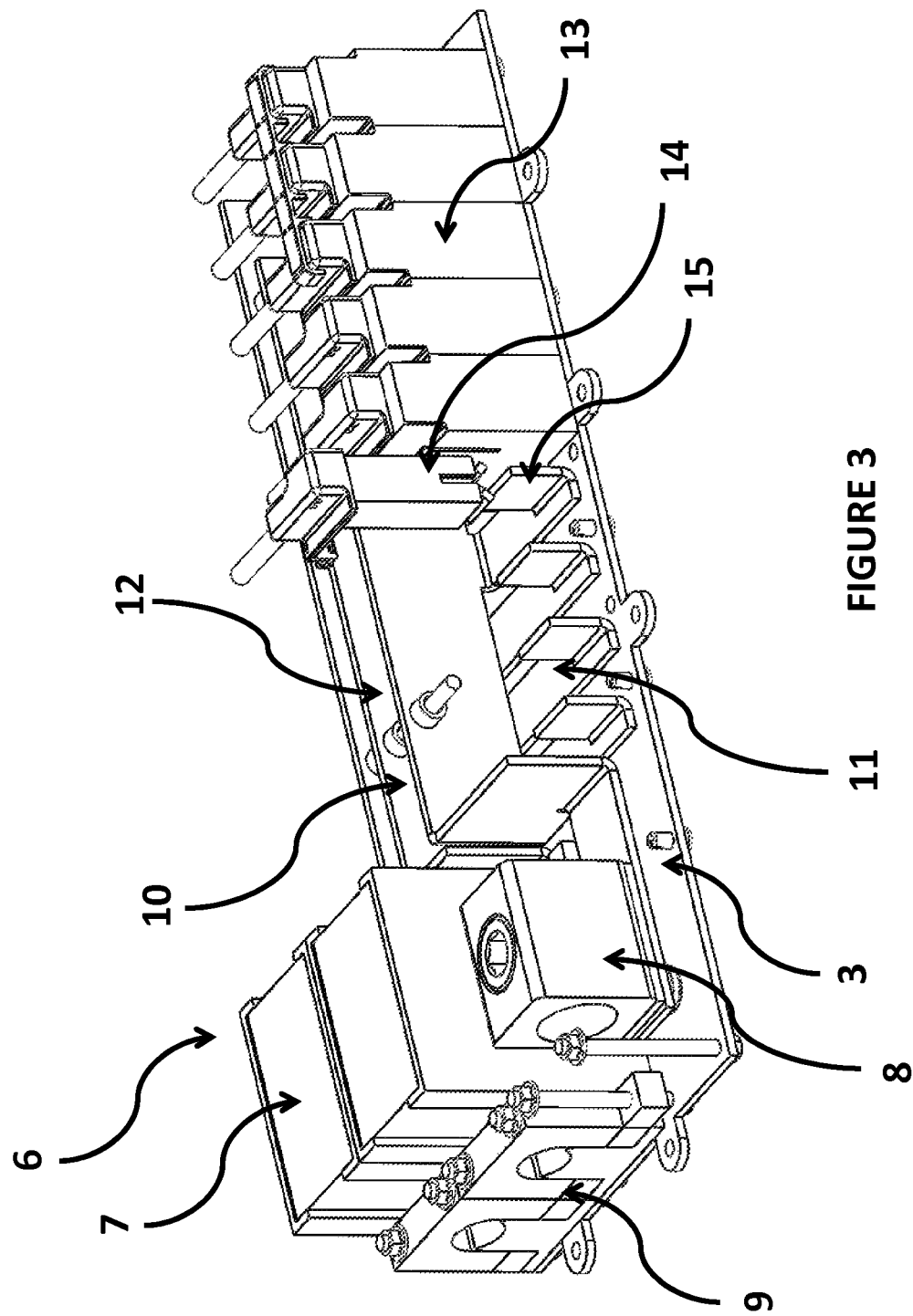
FIG. 3 shows another perspective view of the panelboard of FIG. 1, with the top support and main incoming insulator removed.
Figures 4A, 4B:
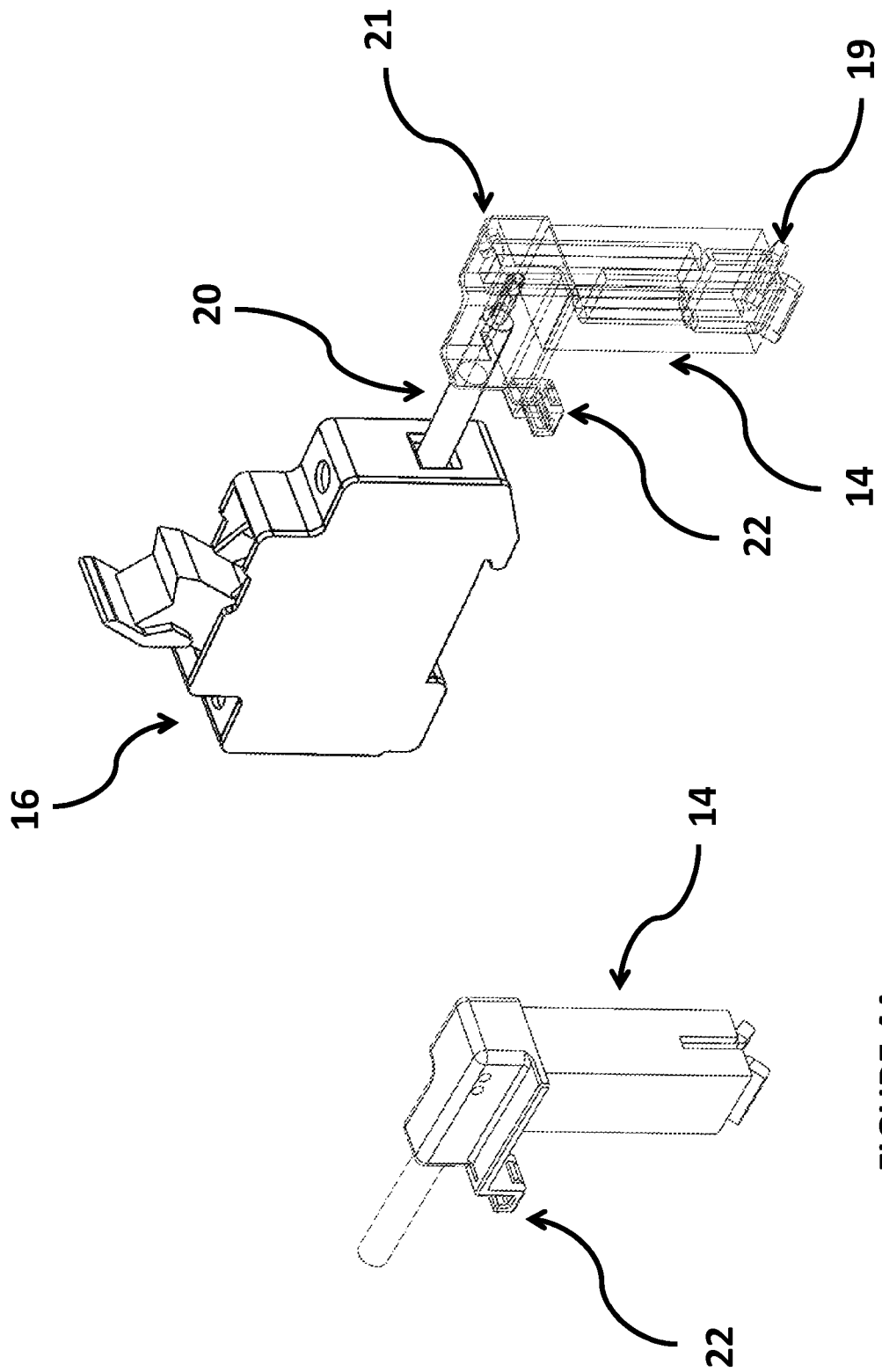
FIG. 4A shows a "plug in" connector with all insulating material intact.
FIG. 4B shows a "plug in" connector with all insulating material "ghosted."

The main electrical connection point housing 6 is located at one end of the panelboard 1. The housing is insulated. The main electrical connection point housing comprises a removable cover 7 which allows access to the main electrical connection point(s) 8, as seen in FIG. 3. A number of main electrical connection supports 9 are located along the front edge of the housing, each comprising an arch-shaped clamp used to secure the main external electrical connection, thereby ensuring that the main electrical connections are stable and secure after installation.

Inside the housing 6, the mechanical (screwed) main electrical connection points 8 allow power to be supplied to the system, and are attached to the main power bus bar 10, thereby allowing power to be distributed to peripheral feeder points 11. The main power bus bar 10 is insulated, and runs the length of the system. The bus bar 10 may be supported by pins 12 inserted into the insulators 13 described below. Peripheral feeder points comprise a "plug in" connector 14 to create electrical connection points 15 that allow power to feed from the main power bus bar 10 to a plurality of electrical devices 16. Electrical connections are housed in the insulators 13 described below. One or more bus bars may be present.

Electrical devices 16 typically are placed on the top of the system, and energized by a plurality of electrical "plug in" connectors 14. Device spacers 17 are designed to space the product apart at a certain "pitch" to make all market components compatible with the system of the present invention. The spacer maintains device alignment with electrical connections when multiple electrical devices are placed on the system.

One side of the panelboard comprises a number of insulators 13 that isolate the main electrical bus 10 and "plug in" connector 14 connection points. Each insulator comprises several insulated wells 18 where "plug in" connectors 14 are inserted to make electrical connections to the main power bus bar 10.

The electrical "plug-in" connectors 14 comprise a clamp type bus 19 housed in insulating material 21 to make electrical connections to the main power bus bar within a plurality of insulated wells 18 contained in the insulators 13 housing the peripheral feeder bus 11. These allow personnel to connect system power to various electrical devices. One end of the "plug in" electrical device connector 14 connects to the main power via the clamp type bus connection 19, and the other end connects to the electrical device 16 through a wire 20 connection (e.g., a copper wire). The wire 20 is joined to the clamp type bus connection 19.

The details of the electrical device connectors may be seen in FIGS. 3 and 4, which show some of the connectors with covers and insulators "ghosted" and removed. FIG. 4 shows a "plug in" electrical device connector 16 removed from the panelboard. The connector comprises an insulating housing 21, which may be plastic. The base of the connector and clamp type bus 19 is inserted into a corresponding insulated well 18. Once inserted, the "plug in" connector may be secured. A securing "catch" 22 secures the pluggable connector 14 to the top of a plurality of insulators 13 which house the insulated wells 18. The securing catch may be released from the insulator via standard screw driver application allowing for removal of the "plug in" connector.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A panelboard, comprising:
    a central body having a top surface, a bottom, and two sides;
    at least one bus bar positioned within the central body;
    a plurality of peripheral feeder points extending from said at least one bus bar into a plurality of isolated connection wells within an insulating body, wherein each of said plurality of peripheral feeder points extends into a single corresponding isolated connection well; and
    a plurality of insulated plug-in connectors adapted to be inserted into said isolated connection wells and be electrically connected to said plurality of peripheral feeder points.

2. The panelboard of claim 1, wherein all energized parts of the panelboard are insulated or protected from exterior contact.

3. The panelboard of claim 1, wherein the connection wells are insulated.

4. The panelboard of claim 1, wherein the at least one bus bar is independently insulated.

5. The panelboard of claim 1, wherein each of said plurality of insulated plug-in connectors comprises a clamp connector that removably fastens onto the corresponding peripheral feeder point when said plug-in connector is inserted into the corresponding isolated a connection well.

6. The panelboard of claim 1, further comprising a plurality of electrical devices separately housed from said plurality of insulated plug-in connectors, each of said electrical devices removably connected to a corresponding insulated plug-in connector by a wire connection extending from the top of said corresponding insulated plug-in connector.

7. The panelboard of claim 6, wherein said electrical devices are located on the top surface of the central body.

8. The panelboard of claim 7, further comprising one or more spacers adapted to fit between adjacent electrical devices to position said adjacent electrical devices apart and maintain device alignment with electrical connections to said plurality of insulated plug-in connectors.

9. The panelboard of claim 1, each of said plurality of insulated plug-in connectors further comprising a non-energized securing catch.

10. The panelboard of claim 6, wherein said plurality of insulated plug-in connectors are located on the opposite side of the bus bar from said plurality of electrical devices.

11. The panelboard of claim 6, wherein said plurality of insulated plug-in connectors are secured separately from said plurality of electrical devices.

12. The panelboard of claim 6, wherein said plurality of electrical devices do not comprise the same type of device.

13. A panelboard, comprising:
- a central body having a top surface, a bottom, and two sides;
- a central bus bar positioned within the central body portion;
- a plurality of isolated connection wells extending along one side of said central bus bar;
- a plurality of peripheral feeder points extending from said central bus bar, each of said peripheral feeder points extending into a corresponding isolated connection well; and
- a plurality of insulated plug-in connectors adapted to be inserted into said isolated connection wells and be electrically connected to said plurality of peripheral feeder points.

14. The panelboard of claim 13, wherein each plug-in connector comprises a clamp connector that fastens onto the corresponding peripheral feeder point.

15. The panelboard of claim 1, further comprising a plurality of electrical devices, said electrical devices electrically connected to said plurality of plug-in connectors.

16. The panelboard of claim 15, wherein said electrical devices are located on the top surface of the central body.

17. The panelboard of claim 16, further comprising one or more spacers adapted to fit between adjacent electrical devices to position said adjacent electrical devices apart.

18. The panelboard of claim 13, each of said insulated plug-in connectors further comprising a non-energized securing catch.

19. A panelboard system, comprising:
- at least one plug-in connector, said at least one plug-in connector comprising:
  - a top and a bottom, the bottom comprising a clamp connector adapted to slide over a peripheral feeder point inside an insulated well on a panelboard;
  - a connection wire extending from the top of the plug-in connector, said connection wire adapted to removably connect to an electrical device independent of the plug-in connector; and
  - a non-energized security catch extending from the top of the plug-in connector, adapted to secure the plug-in connector within the insulated well.

20. The panelboard system of claim 19, further comprising an independently insulated bus bar within the panelboard, wherein said peripheral feeder point extends from one side of said insulated bus bar to said insulated well.

21. The panelboard system of claim 19, wherein said at least one plug-in connector is adapted to removably connect to multiple types of electrical devices.

* * * * *